United States Patent Office 2,711,928
Patented June 28, 1955

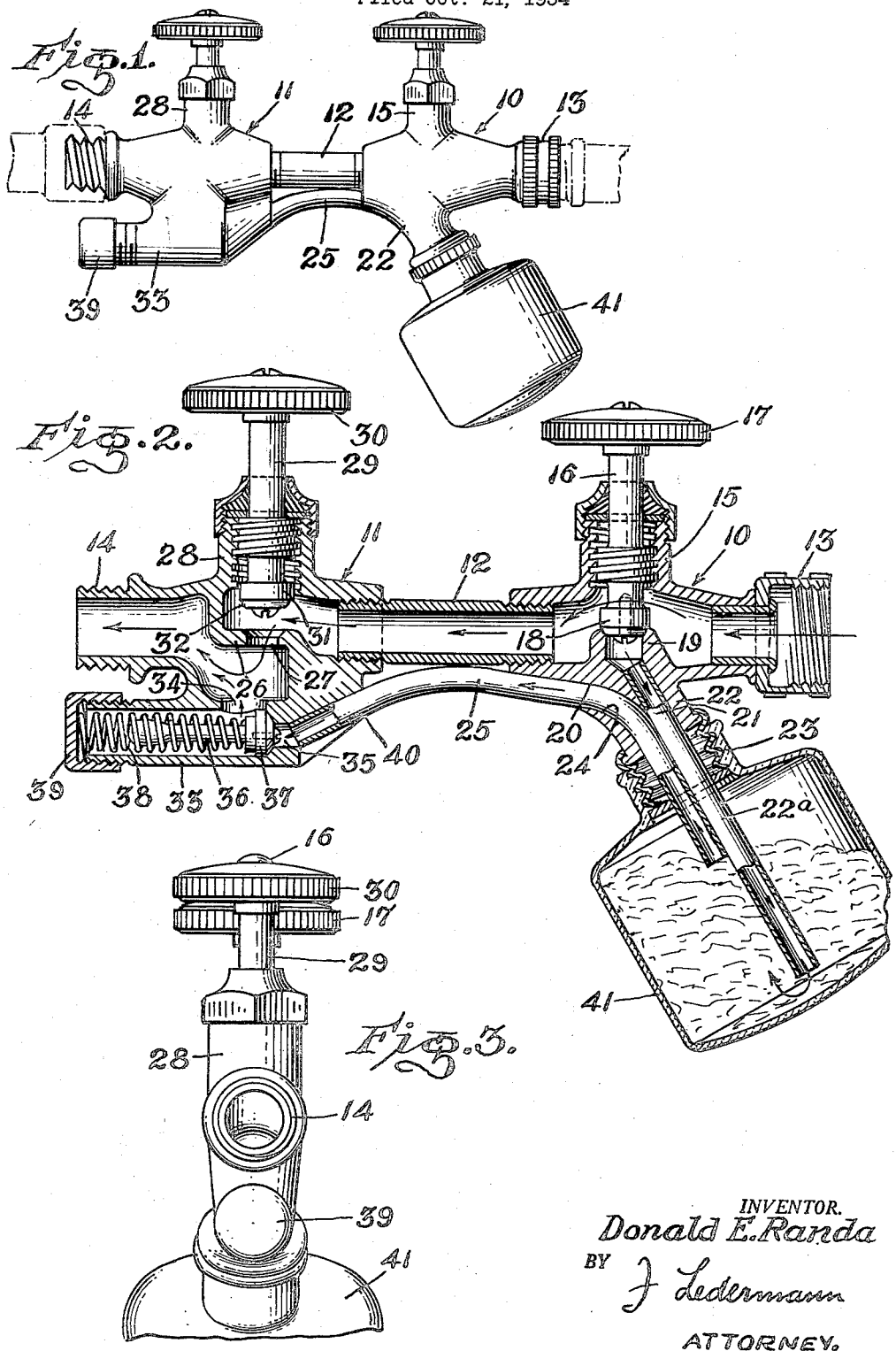

2,711,928

MIXING VALVES FOR CAR WASHING AND OTHER PURPOSES

Donald Ernest Randa, New York, N. Y.

Application October 21, 1954, Serial No. 463,684

3 Claims. (Cl. 299—84)

This invention relates to mixing valves and the main object is the provision of a novel, practical and efficient dual valve mixing unit of small compass so that it may be held in the hand and adapted for efficient use in washing cars as well as for numerous other purposes.

Another object of the invention is the provision of the device mentioned above with a removable and refillable container or cartridge adapted to contain soap in any form or a detergent or other washing aid, the soap or the like being adapted to be fed under control of one of the dual valves into the stream issuing through the device over a range of zero issue of the soap to the maximum permissible by the said valve. Thus, when the soap issue is completely shut off, only clear water will flow through the device and issue from the outlet, which is of course a desirable condition for rinsing off to terminate the cleaning operation.

Just to mention one other application of the device, it may be used to mix a fertilizer material with water to fertilize a lawn or, with the aid of a root reaching attachment, to fertilize shrub, tree or other plant roots.

The above broad as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention to any or all of the exact details of construction shown or described nor to any particular application of the device or use to which it may be put, except insofar as such may be deemed essential to the invention.

Referring briefly to the drawing,

Fig. 1 is a side elevational view of the dual valve mixing unit embodying the features of the present invention.

Fig. 2 is a longitudinal vertical sectional view through the device.

Fig. 3 is a fragmentary front elevational view of the device.

Referring in detail to the drawing, the numeral 10 indicates one valve housing and the numeral 11 another valve housing, the two being connected in series by a pipe or the like 12. The valve 10 has an inlet nipple 13 and the valve 11 an outlet nipple 14.

The housing 10 has an upright internally threaded cylinder formed integral therewith in which the valve stem 16 is threadably mounted, the cylinder being shown at 15, the stem 16 having a suitable handle 17, and having on its lower extremity a valve head 18. In alignment with the cylinder and valve stem, is a cylindrical valve seat 19 on which, through the medium of a suitable washer 20, the valve head 18 is adapted to seat.

A stub pipe section 22 terminating in a threaded nipple 23 extends downward at an angle from the housing 10 and has a passage 21 extending therethrough and communicating with the valve seat 19. A tube 22a is frictionally held in the passage 21 and projects a distance beyond the nipple 23. A second deformed passage 24 extends upward through the nipple 23 and pipe section 22 and out through the front (left hand, Fig. 2) wall of the latter, extending for a distance adjacent the passage 21. A second and deformed tube 25 has one end, which is straight, extending through the passage 24 and out through the nipple 23 but to a shorter distance beyond the nipple than the tube 22a. The section 22 is solid inside except for the two passages 21 and 24.

The housing 11 has, between its inlet side (at the right thereof, Fig. 2) and its outlet 14, a partition including a horizontal wall 26 having a passage formed as a valve seat, 27, therethrough. An upper cylindrical wall 28, in alignment with the passage 27, extends from the top of the housing 11, and is internally threaded to receive the threaded valve stem 29 surmounted by the handle 30. The lower end of the stem 29 has the valve head 31 thereon, adapted to seat on the passage 27, also through the medium of a washer, 32.

A tubular extension 33 is formed integral with the housing 11 under the nipple 14 and has an opening 34 communicating with the interior of the housing 11. At its inner end the extension 33 has a reduced opening 35 shaped into a valve seat. A valve stem 36 having a head 37 thereon adapted to seat on the opening 35, is surrounded by a compression spring 38 normally urging the valve head 37 to close the passage 35. A threaded cap 39 closes the forward end of the tubular extension 33.

The passage 40 at the lower right-hand end of the housing 11, Fig. 2, communicates with the opening 35 and extends out through the housing. The front end of the deformed tube 25 registers in the passage 40.

The operation of the device is as follows. Assuming that it is desired to mix any ingredient contained in the container 41 which is adapted to be screwed on to the nipple 23, with the tube 22a entering deep into the container, the valve stem 29 being at first open and the stem 16 being closed down, the latter is raised as desired for the proper amount of mixture of the substance in the container. Water entering the nipple 13 then flows partly past the lower portion of the stem 16 and partly enters the tube 22a and forces contents from the container up through the tube 25 while at the same time stirring the contents. Thus the controlled amount of container contents flows through the tube 25 and forces the valve head 37 away from its seat 35 to permit the said contents to enter the housing 11 through the opening 34 and mix with the water issuing through the opening 27, the mixture exiting through the nipple 14, to which, if desired, any suitable spray or other flow conditioning attachment, not shown, may be connected. When it is desired to permit only water to emerge from the outlet 14, the stem 16 is screwed down on its seat 19, thus shutting off communication with the container 41. With both stems 29 and 16 screwed down, there is of course no flow through the device.

Should it be desired to flush out the container 41 prior to filling it with another substance, the stem 29 is screwed down and the stem 16 is raised, so that the water entering the device all flows through the tube 22a into the container and out through the tube 25 and the outlet 14. The entire valve assembly in the tubular extension 33 may be removed by unscrewing the cap 39, for cleaning or replacing the washer 42 thereon. By providing suitable hose or other connections or attachments with the device, it may be used for many different applications where a mixture of any substance is desired with water, as is apparent.

Obviously, modifications in form or structure may be made without departing from the spirit or scope of the invention.

I claim:

1. A mixing unit comprising a valve housing having a threaded radial opening thereinto and a valve stem threaded into said opening and a second valve housing having a threaded radial opening thereinto and a valve stem threaded into said second radial opening, said housings being joined in series to provide a continuous passage therethrough, one end of said first-named housing comprising the inlet into said passage and one end of said second housing comprising the outlet of said passage, said first-named housing having an opening thereinto opposite and in alignment with said radial opening thereof, said first-named stem having a head thereon adapted to seat on said opposite opening, a stub extension on said first-named housing having a passage therethrough terminating in said opposite opening and having a nipple on the end thereof, a tube registering in said stub passage and extending substantially beyond said nipple, said second housing having a partition therein including a midportion at right angles to and positioned under said stem thereof, said midportion having an opening therethrough in alignment with said second stem, said second stem having a head thereon adapted to seat on said midportion opening, said second housing having a tubular extension substantially parallel with the outlet end of said continuous passage, said tubular extension having an opening near the inner end thereof approximately in alignment with said second stem into said housing and said continuous passage and having an additional opening at the inner end thereof, a valve slidably mounted in said tubular extension and having resilient means normally urging the same to close said additional opening, a removable cap closing the outer end of said tubular extension, a deformed tube having one end registering in said additional opening, said stub extension having a second passage therethrough, the other end of said deformed tube registering in said second passage of said stub extension, and a container adapted to be secured to said nipple adapted to contain a substance to be mixed with water flowing through the inlet of the continuous passage.

2. The mixing unit set forth in claim 1, said valve in said tube extension comprising a stem having a head thereon adapted to seat on said additional opening, and a coiled spring surrounding said last-named stem between said cap and said last-named head.

3. The mixing unit set forth in claim 1, said other end of said deformed tube projecting beyond said nipple to a substantially smaller extent than said first-named tube.

References Cited in the file of this patent

UNITED STATES PATENTS

| 811,749 | Somers | Feb. 6, 1906 |
| 2,536,361 | Flanbers | Jan. 2, 1951 |